United States Patent
Ramirez et al.

(10) Patent No.: US 10,289,945 B1
(45) Date of Patent: *May 14, 2019

(54) RFID TAGS FOR ON- AND OFF-METAL APPLICATIONS

(71) Applicant: University of South Florida, Tampa, FL (US)

(72) Inventors: Ramiro Augusto Ramirez, Tampa, FL (US); Thomas McCrea Weller, Lutz, FL (US); Eduardo Antonio Rojas, Temple Terrace, FL (US)

(73) Assignee: University of South Florida, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,138

(22) Filed: Nov. 6, 2017

Related U.S. Application Data

(63) Continuation of application No. 15/215,199, filed on Jul. 20, 2016, now Pat. No. 9,836,685.

(51) Int. Cl.
   *G06K 19/077* (2006.01)
   *G06K 19/00* (2006.01)
   *G06K 19/04* (2006.01)

(52) U.S. Cl.
   CPC ....... *G06K 19/07722* (2013.01); *G06K 19/00* (2013.01); *G06K 19/04* (2013.01);
   (Continued)

(58) Field of Classification Search
   CPC ........ G06K 19/00; G06K 19/04; G06K 19/08; G06K 19/07722; G06K 19/07745;
   (Continued)

(56) References Cited

U.S. PATENT DOCUMENTS

| 8,319,694 B2 | 11/2012 | Yang |
| 8,381,998 B1 | 2/2013 | Chang |

(Continued)

FOREIGN PATENT DOCUMENTS

WO    2014/057464 A4    4/2014

OTHER PUBLICATIONS

Rao, K. V. S., Sander F. Lam, and Pavel V. Nikitin. "UHF RFID tag for metal containers" Microwave Conference Proceedings (APMC), 2010 Asia-Pacific. IEEE, 2010.
(Continued)

*Primary Examiner* — Claude J Brown
(74) *Attorney, Agent, or Firm* — Thomas | Horstemeyer, LLP

(57) ABSTRACT

In one embodiment, a radio-frequency identification (RFID) tag includes a substrate having a top surface including first and second ends, a bottom surface, first and second end surfaces, and opposed lateral surfaces, a passive RFID integrated circuit (IC) chip mounted to the top surface of the substrate, a monopole antenna that includes a planar radiating arm that extends out from the RFID IC chip along the top surface of the substrate to the first end of the top surface of the substrate and a matching loop having two grounded matching stubs that surround the chip and a portion of the radiating arm, each matching stub comprising a longitudinal segment that extends along a longitudinal direction of the substrate and a transverse segment that extends along a transverse direction of the substrate along the top surface of the substrate to the radiating arm at a point located between the RFID IC chip and the first end of the top surface, and a ground plane formed on the bottom surface, the second end surface, and the top surface of the substrate, the ground plane wrapping around the substrate so as to extend from the second end of the top surface toward the RFID IC chip and (Continued)

being electrically coupled to the matching stubs and the radiating arm.

16 Claims, 9 Drawing Sheets

(52) U.S. Cl.
CPC .. *G06K 19/07745* (2013.01); *G06K 19/07775* (2013.01); *G06K 19/07771* (2013.01)

(58) Field of Classification Search
CPC ....... G06K 19/07771; G06K 19/07775; H01Q 1/2225; H05K 1/11
USPC .......................................................... 235/488
See application file for complete search history.

(56) References Cited

U.S. PATENT DOCUMENTS

| | | | | |
|---|---|---|---|---|
| 8,462,073 | B2* | 6/2013 | Shachar | H01P 5/10 29/601 |
| 2007/0046548 | A1* | 3/2007 | Pros | H01Q 1/243 343/702 |
| 2007/0120677 | A1 | 5/2007 | Park | |
| 2008/0055045 | A1 | 3/2008 | Swan | |
| 2008/0111688 | A1 | 5/2008 | Nikitin | |
| 2010/0127943 | A1* | 5/2010 | Inoue | H01Q 15/14 343/702 |
| 2013/0120197 | A1* | 5/2013 | Lin | H01Q 1/38 343/700 MS |
| 2013/0123726 | A1* | 5/2013 | Yu | H01Q 1/2225 604/361 |
| 2014/0232608 | A1* | 8/2014 | Zhao | H01Q 1/38 343/866 |
| 2016/0294063 | A1* | 10/2016 | McGough | H01Q 9/28 |

OTHER PUBLICATIONS

Lee, J-W., and B. Lee. "Design of high-Q UHF radio-frequency identification tag antennas for an increased read range." IET microwaves, antennas & propagation 2.7 (2008): 711-717.

Hodges, Steve, et al. "Assessing and optimizing the range of UHF RFID to enable real-world pervasive computing applications." Pervasive Computing. Springer Berlin Heidelberg, 2007. 280-297.

Hongwei, et al., "3D antenna for UHF RFID tags with near omni-direction", in Antennas, Propagation and EM Theory, 2008; 8th International Sumposium.

Ramirez, et al., "3D tag with immproved read range for UHF RFID applications using Additive Manufacturing", In Wireless and Microwave Technology Conference, 2015 IEEE, 2015.

Phatarachaisakul, et al., "Tag antenna using printed dipole with H-slot for UHF RFID applications", In EE Congress (iEECON), 2014 International.

Yejun, et al., "A new UHF anti-metal RFID tag antenna design with open-circuited stub feed", In ICC, 2013 IEEE International conference.

Genovesi, et al., "Low-profile three-arm folded dipole antenna for UHF band RFID tags mountable on metallic Objects" Antennas and Wireless Propagation Letters, IEEE vol. 9, 2010.

Abdulhadi, et al., "Passive UFH RFID printed monopole tag antenna for identification of metallic objects", in Antennas and Propagation Society International Symposium, 2012, IEEE.

XNP.Semiconductors, Smart label and tag ICs (UCODE) SL3S1203_1213 Datasheet, vol. rev 4.3, Nov. 27, 2013.

S. R. Best, "The significance of ground-plane size and antenna location in establishing the performance of ground-plane-dependent antennas", Antennas and propagation magazine, IEEE vol. 15, 2009.

L. J. Chu, "Physical limitations of antenna Q" Journal of applied physics, Dec. 1948.

Rojas-Nastrucci, et al., "A study on 3D-printed coplanar waveguide with meshed and finite grounds planes", in Wireless and Microwave Technology conference (WAMICON), 2014, IEEE 15th annual.

Strauss, et al., "Read range measurements of UHR RFID transponders in mobile anechoic chamber", in RFID, 2009 IEEE International conference, 2009.

* cited by examiner

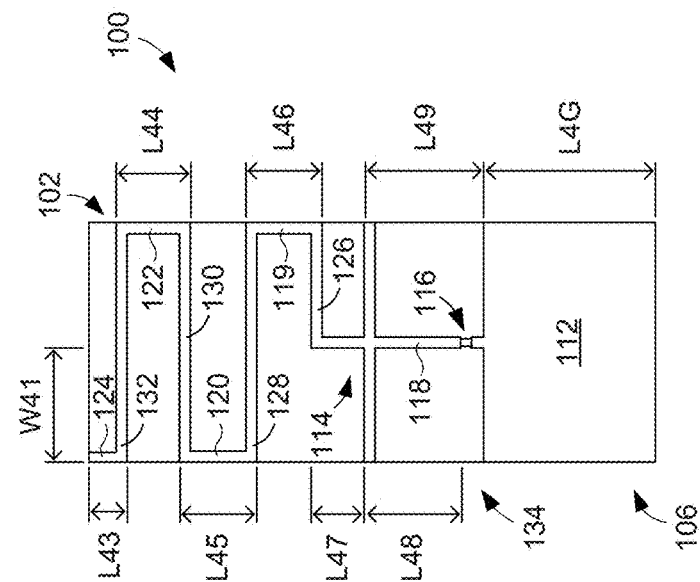
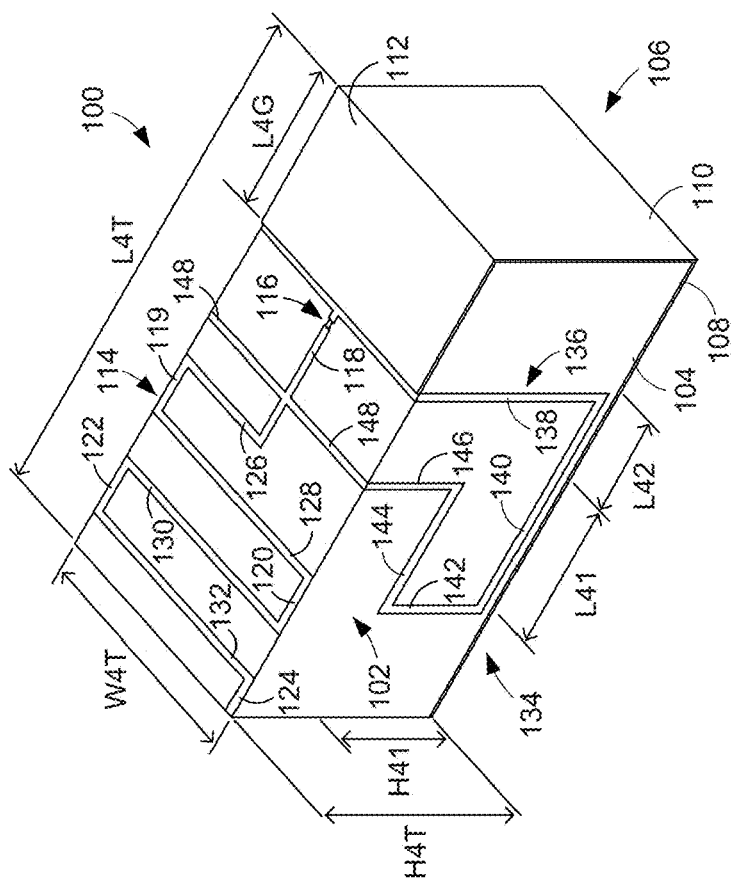
FIG. 4B
FIG. 4A

RFID TAGS FOR ON- AND OFF-METAL APPLICATIONS

CROSS-REFERENCE TO RELATED APPLICATION

This application is a continuation application of co-pending U.S. Non-Provisional Application entitled "RFID TAGS FOR ON-AND OFF-METAL APPLICATIONS," having Ser. No. 15/215,199, and filed Jul. 20, 2016, which is entirely incorporated herein by reference.

BACKGROUND

Radio-frequency identification (RFID) applications continue to increase in number and new uses of the technology have prompted innovative tag designs. Achieving smaller tag footprints is of particular importance, motivating the development of three-dimensional designs that make more efficient use of the antenna volume. However, most commercial tag designs are optimized either for on-metal or off-metal conditions, and their performance is greatly diminished when the surrounding environment differs from the intended one. For example, dipole antennas can be used for off-metal systems, but often fail to operate properly when mounted horizontally over or near metallic objects. Patch antennas and folded dipoles, on the other hand, have been implemented for on-metal systems, but generally have a low off-metal read range.

From the above discussion, it can be appreciated that it would be desirable to have an RFID tag, and a tag antenna, that can be used in both on- and off-metal applications.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 4A is a perspective view of a fourth embodiment of an RFID tag.

FIG. 4B is a top view of the tag of FIG. 4A.

DETAILED DESCRIPTION

As described above, it would be desirable to have a radio-frequency identification (RFID) tag that incorporates an antenna that can be used in both on- and off-metal applications. Disclosed herein are RFID tags that are suitable for on-metal and off-metal applications. In some embodiments, the tag comprises a passive RFID IC chip that is mounted to a top surface of a substrate, a monopole antenna that includes a radiating arm that extends out from the chip along the top surface and a matching loop having two grounded matching stubs that surround the chip and a portion of the radiating arm, and a ground plane that extends from a bottom surface of the substrate and up onto the top surface of the substrate. In some embodiments, the radiating arm is linear. In other embodiments, the radiating arm is meandered. In some embodiments, the matching loop is contained on the top surface of the substrate. In other embodiments, the matching loop further extends onto lateral surfaces of the substrate.

In the following disclosure, various specific embodiments are described. It is to be understood that those embodiments are example implementations of the disclosed inventions and that alternative embodiments are possible. All such embodiments are intended to fall within the scope of this disclosure.

Disclosed herein are RFID tags that are optimized to operate in both on-metal and off-metal conditions. Impedance matching to the passive RFID integrated circuit (IC) chip is achieved using two parallel stubs to ground, which enables the tags to cover the ISM RFID UHF bands (864-868 MHz and 902-928 MHz). On-metal read ranges of greater than 12 m are achievable using a tag having a very small footprint due to its three-dimensional design. Meshed ground planes can be used to reduce the conductive ink usage (by ~50%) and printing time, while having minimal effect on the tag performance.

Figure 1B:
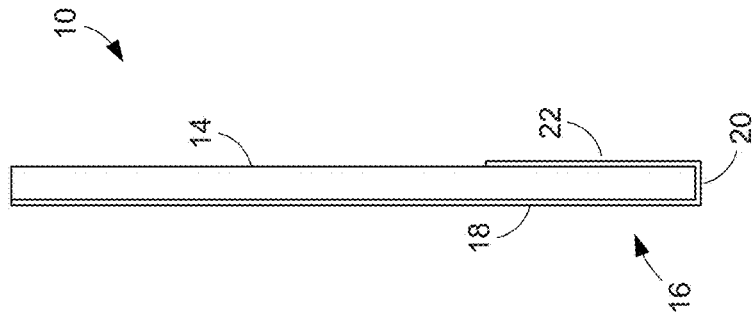
FIG. 1B is a side view of the tag of FIG. 1A.
Figure 1A:
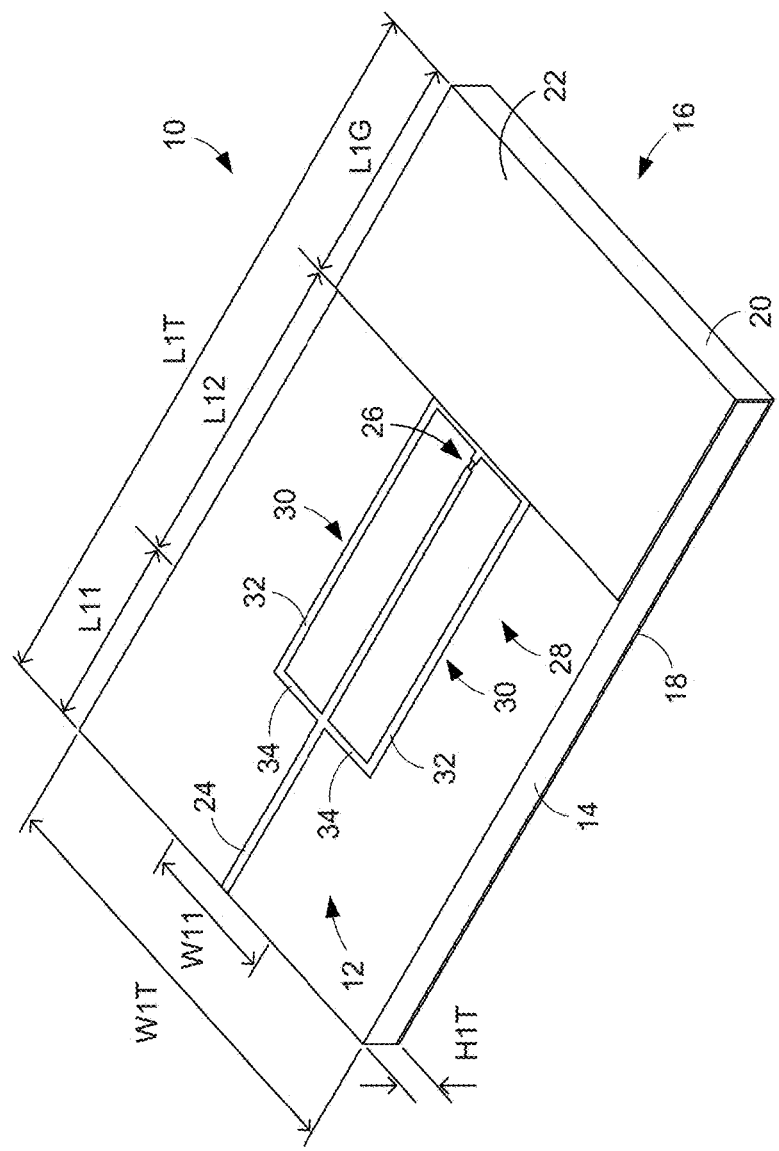
FIG. 1A is a perspective view of a first embodiment of a radio frequency identification (RFID) tag.

FIGS. 1A and 1B illustrate a first embodiment of an RFID tag 10. In this embodiment, the tag 10 comprises a two-dimensional antenna 12 that is formed on a low-permittivity substrate 14. The substrate 14 can be formed as a rectangular cuboid having a top surface, a bottom surface, opposed end surfaces, and opposed lateral surfaces. In some embodiments, the substrate 14 comprises an acrylonitrile butadiene styrene (ABS) substrate formed using an additive manufacturing method, such as fused deposition modeling (FDM). In some embodiments, the thickness of the substrate 14 is many times smaller than the length of the substrate. By way of example, the substrate 14 can be 6 mm thick and have an area of approximately 13,126.5 mm². In some embodiments, the measured electrical properties at 1 GHz of the substrate 14 are $\varepsilon_r=2.6$ and $\tan \delta=0.0058$.

The design of the tag 10 enables constructive, in-phase reflections from a ground plane 16 that extends along the bottom of the substrate 14 and wraps around an end of the substrate to extend across a portion of the top of the substrate. Accordingly, the ground plane 16 comprises a lower portion 18 that covers a bottom surface of the substrate 14, an end portion 20 that covers an end surface of the substrate, and a top portion 22 that covers a portion of a top surface of the substrate on which the antenna 12 is formed.

The antenna 12 is configured as a planar monopole antenna comprising a linear radiating arm 24 that is used as the radiating element and achieves broadside radiation particularly while mounted on metallic objects. This arm 24 extends along a longitudinal direction of the substrate 14 from a passive RFID integrated circuit (IC) chip 26. By way of example, the RFID IC chip 26 comprises an NXP UCODE G2il SL3S1203_1213 passive RFID IC chip, which has a sensitivity of −18 dBm. In some embodiments, the arm 24 is formed by micro-dispensing of silver paste, such as Dupont CB028 silver paste, on the top surface of the substrate 14. The paste can be printed using, for example, an nScrypt Tabletop 3Dn printer having a 125 µm inner diameter ceramic tip. Once the paste has been printed, it can be dried. For example, the paste can be dried at 90° C. for 60 minutes. A monopole design was also chosen because of its ease of manufacturing and integration with printed circuit boards and surface-mount components, such as the chip 26.

The antenna 12 is designed to be conjugate matched to the RFID IC chip 26, which can have normal mode impedances at 866 MHz and 915 MHz of Zin=(25-j237) Ω and Zin=(23-j224) Ω, respectively. The stable impedance over frequency makes the chip useful for dual band operation. The impedance matching from the antenna 12 to the RFID IC chip 26 is achieved using a matching loop 28 including two grounded tuning stubs 30. The stubs 30 each include a longitudinal segment 32 that extends from the top portion 22 of the ground plane 16 along the longitudinal direction of the substrate 14 on either side of the radiating arm 24 (parallel thereto), and a transverse segment 34 that extends from an end of the longitudinal segment along a transverse direction of the substrate to the radiating arm. The lengths of the longitudinal and transverse segments 32, 34 of the stubs 30 can be adjusted to provide the necessary susceptance to achieve a matched condition. A simulated broadside gain of 3.16 dBi is achieved both on- and off-metal.

Example dimensions for the RFID tag 10 are shown in Table I. In this embodiment, the antenna's radiating arm 12 is 67.5 mm long and is optimized from a $\lambda_g/4$ length at the center frequency of the European (862-868 MHz) and American (902-928 MHz) ISM RFID bands.

TABLE I

Dimensions for the Tag Designs

| Variable | Value (mm) | Variable | Value (mm) | Variable | Value (mm) |
|---|---|---|---|---|---|
| LIT | 98.75 | W21 | 19.00 | L41 | 14.00 |
| L11 | 25.50 | H2T | 06.00 | L42 | 12.00 |
| L12 | 42.00 | | | L43 | 03.50 |
| LIG | 31.25 | L3T | 97.75 | L44 | 07.00 |
| WIT | 57.00 | L31 | 40.50 | L45 | 07.00 |
| W11 | 19.00 | L32 | 26.25 | L46 | 07.00 |
| HIT | 06.00 | L3G | 31.00 | L47 | 05.00 |
| | | W3T | 22.50 | L48 | 09.00 |
| L2T | 98.75 | H3T | 22.00 | L49 | 11.25 |
| L21 | 25.50 | H31 | 10.75 | L4G | 16.00 |
| L22 | 42.00 | | | H4T | 22.00 |
| L2G | 31.25 | W41 | 10.25 | H41 | 10.75 |
| W2T | 22.50 | L4T | 52.75 | W4T | 22.50 |

Figure 2:
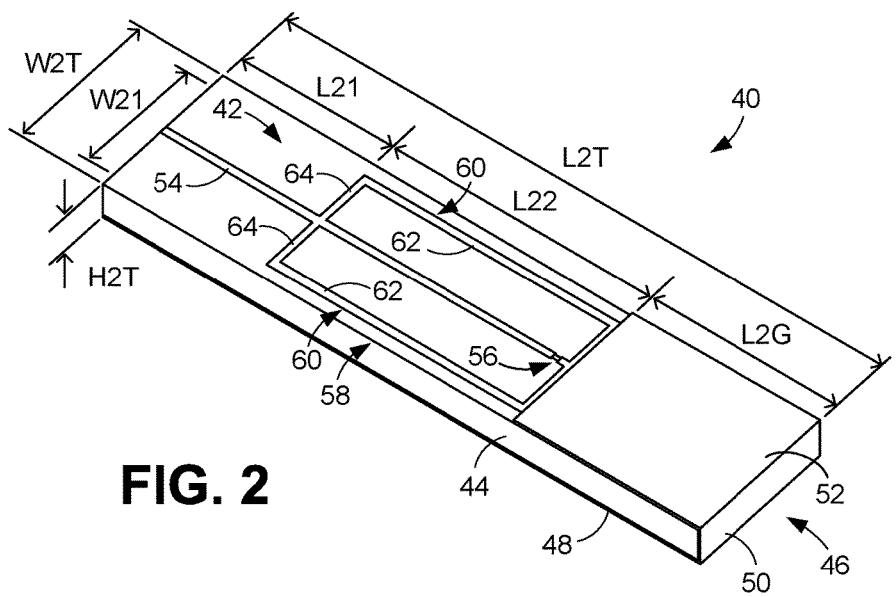
FIG. 2 is a perspective view of a second embodiment of an RFID tag.

FIG. 2 illustrates a second embodiment of an RFID tag 40 that is similar in design to the RFID tag 10. Accordingly, the tag 40 also comprises a two-dimensional antenna 42 that is formed on a low-permittivity substrate 44, which can be 6 mm thick and made of ABS.

The tag 40 includes a ground plane 46 that comprises a lower portion 48 that covers a bottom surface of the substrate 44, an end portion 50 that covers an end surface of the substrate, and a top portion 52 that covers a portion of a top surface of the substrate on which the antenna 42 is formed.

The antenna 42 is configured as a planar monopole antenna including a linear radiating arm 54 that extends along a longitudinal direction of the substrate 44 from a passive RFID integrated circuit (IC) chip 56. As with the arm 24, the arm 54 can be formed by micro-dispensing of silver paste on the top surface of the substrate 44.

The antenna 42 further comprises a matching loop 58 including two grounded tuning stubs 60, which each include a longitudinal segment 62 that extends from the top portion 52 of the ground plane 46 along the longitudinal direction of the substrate 44 on either side of the radiating arm 54 (parallel thereto), and a transverse segment 64 that extends from an end of the longitudinal segment along a transverse direction of the substrate to the radiating arm.

While the embodiment of FIG. 2 shares many similarities with the embodiment of FIG. 1, the RFID tag 40 shown in FIG. 2 is much smaller than the RFID tag 10 shown in FIG. 1. In particular, the tag 40 is much narrower than the tag 10 and, therefore, has a smaller footprint. In some embodiments, the tag 40 has a width of 22.5 mm, as compared to 57 mm for the tag 10, and an area of 5,898.7 mm$^2$, which reflects a footprint reduction of 222%. Although the tag 40 has a smaller footprint, it is designed to provide similar performance for both on- and off-metal applications. The reduction of the ground plane width, however, compromises the antenna radiation efficiency and therefore the peak broadside gain due to an increase in edge radiation. The simulated off-metal broadside gain for the tag 40 design is 1.8 dBi compared to 3.16 dBi for the tag 10.

Example dimensions for the RFID tag 40 are also shown in Table I.

Figure 3:
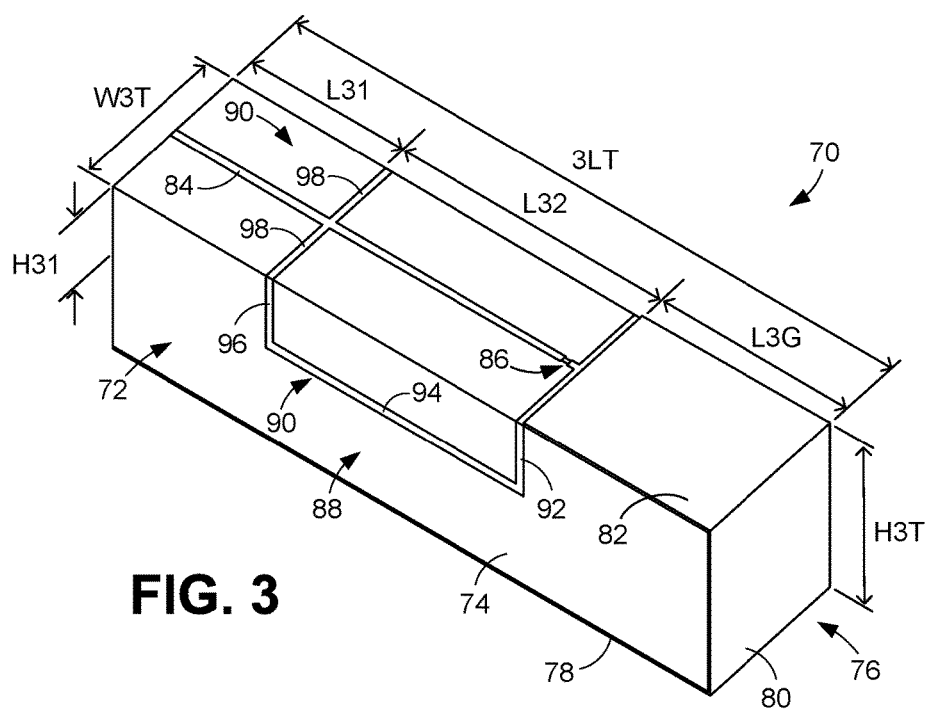
FIG. 3 is a perspective view of a third embodiment of an RFID tag.

One approach to account for the gain reduction of the smaller ground plane is to introduce a three-dimensional geometry. FIG. 3 illustrates an embodiment of an RFID tag 70 that has such a geometry. The tag 70 comprises a three-dimensional antenna 72 that is formed on a thick, low-permittivity substrate 74, which can be made of ABS. In some embodiments, the thickness of the substrate 74 is approximately one-quarter the length of the substrate. By way of example, the substrate 74 can be approximately 1 mm thick.

The tag 70 includes a ground plane 76 that comprises a lower portion 78 that covers a bottom surface of the substrate 74, an end portion 80 that covers an end surface of the substrate, and a top portion 82 that covers a portion of a top surface of the substrate on which the antenna 72 is formed.

The antenna 72 is configured as a planar monopole antenna including a linear radiating arm 84 that extends along a longitudinal direction of the substrate 74 from a passive RFID integrated circuit (IC) chip 86. The arm 84 can be formed by micro-dispensing of silver paste on the top surface of the substrate 74.

The antenna 72 further comprises a matching loop 88 that includes two grounded tuning stubs 90. In this embodiment, however, the stubs 90 extend across the top surface of the substrate 74 and opposed lateral surfaces of the substrate. More particularly, the stubs 90 include a first vertical segment 92 that extends downward from the top surface and the top portion 82 of the ground plane 76 along the lateral surface of the substrate 74, a horizontal segment 94 that extends from an end of the first vertical segment along the lateral surface and along the longitudinal direction of the substrate, a second vertical segment 96 that extends upward from an end of the horizontal segment along the lateral surface of the substrate to its top surface, and a transverse segment 98 that extends from an end of the second vertical segment along the top of the substrate in the transverse direction to the radiating arm 84. With this configuration, a much larger matching loop 88 is provided without increasing the footprint of the tag 70

Example dimensions for the RFID tag 70 are also shown in Table I.

Further size reduction can be achieved by using a meandered radiating arm to compress the antenna into a reduced footprint. FIGS. 4A and 4B illustrate an embodiment of an RFID tag 100 that utilizes such a configuration. The tag 100 also comprises a three-dimensional antenna 102 that is formed on a thick, low-permittivity substrate 104 that can be made of ABS. In some embodiments, the thickness of the substrate 104 is approximately half the length of the substrate. By way of example, the substrate 104 is approximately 1 mm thick.

The tag 100 includes a ground plane 106 that comprises a lower portion 108 that covers a bottom surface of the substrate 104, an end portion 110 that covers an end surface of the substrate, and a top portion 112 that covers a portion of a top surface of the substrate on which the antenna 102 is formed.

The antenna 102 is configured as a planar monopole antenna including a meandered radiating arm 114 that extends along a longitudinal direction of the substrate 104 from a passive RFID integrated circuit (IC) chip 116. As shown in FIGS. 4A and 4B, the arm 114 includes multiple longitudinal segments 118, 119, 120, 122, and 124 that connect with multiple transverse segments 126, 128, 130, and 132 to form a continuous meandered structure that results in a relatively long radiating arm 114 that occupies a relatively small area. The longer radiating arm 114 is needed to overcome the reduction in effective length that is produced by greater electric field coupling between the segments. As before, the arm 114 can be formed by microdispensing of silver paste on the top surface of the substrate 104.

The antenna 102 further comprises a matching loop 134 that includes two grounded tuning stubs 136 that extend across the top and lateral surfaces of the substrate 104. More particularly, the stubs 136 include a first vertical segment 138 that extends downward from the top surface and the top portion 112 of the ground plane 106 along the lateral surface of the substrate 104, a first horizontal segment 140 that extends from an end of the first vertical segment along the lateral surface and along the longitudinal direction of the substrate, a second vertical segment 142 that extends upward from an end of the first horizontal segment along the lateral surface of the substrate, a second horizontal segment 144 that extends from an end of the second vertical segment along the lateral surface and along the longitudinal direction of the substrate, a third vertical segment 146 that extends upward from an end of the second horizontal segment along the lateral surface of the substrate to its top surface, and a transverse segment 148 that extends from an end of the third vertical segment along the top of the substrate in the transverse direction to the radiating arm 114.

The geometry of the tag 100 takes advantage of the available radiation sphere in a more efficient way when compared with the other designs and provides an electrical size at 915 MHz of ka=0.588 compared to 1.093 (tag 10), 0.972 (tag 40) and 0.983 (tag 70).

Example dimensions for the RFID tag 100 are also shown in Table I.

Figure 5:
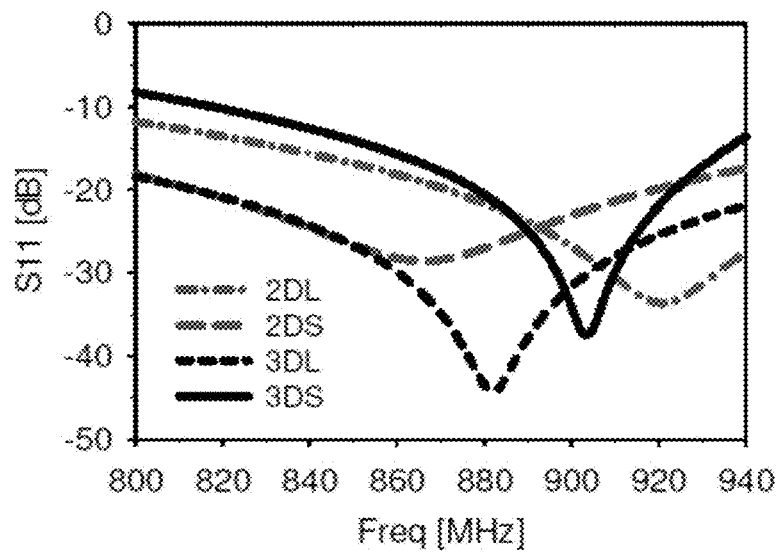
FIG. 5 is a graph that plots simulated reflection coefficient for the tag designs of FIGS. 1-4.

FIG. 5 shows the simulated reflection coefficients for the RFID tags described above. The tag 100 enables an area reduction compared to the tag 10 of 520% while maintaining a similar on-metal performance with a broadside simulated gain of 5.02 dBi while mounted over a 0.9 m diameter copper disc and 3 dBi gain while mounted over a 300×300 mm² rectangular ground plane. The four tags show a simulated −10 dB reflection coefficient bandwidth that allows them to operate in both the European and American RFID ISM frequency bands. Simulations were performed with ANSYS HFSS 15.

Figure 6A:
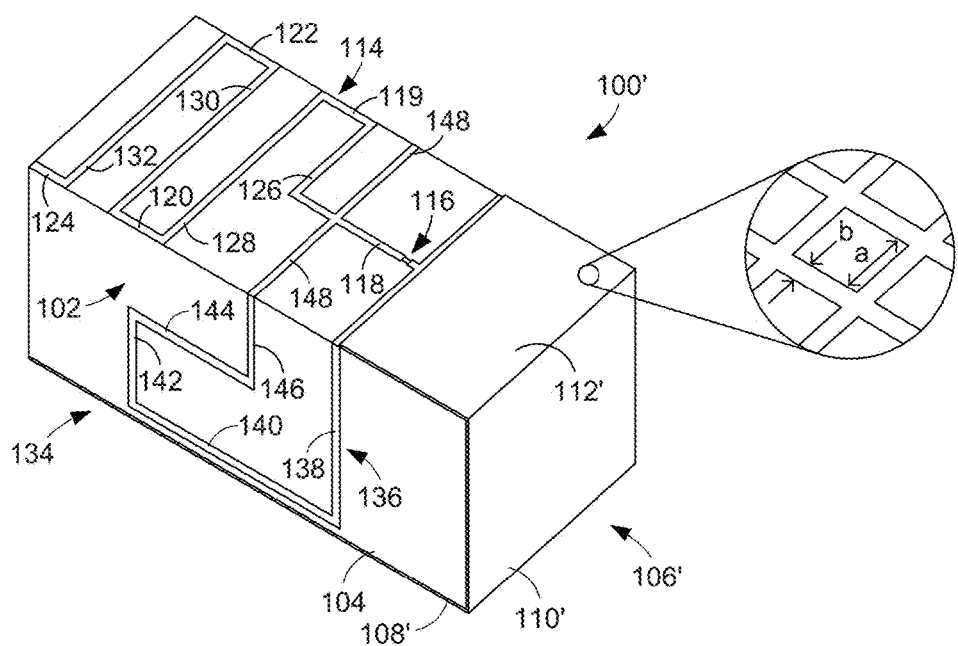
FIG. 6A is a perspective view of an RFID tag having a meshed ground plane.
Figure 6B:
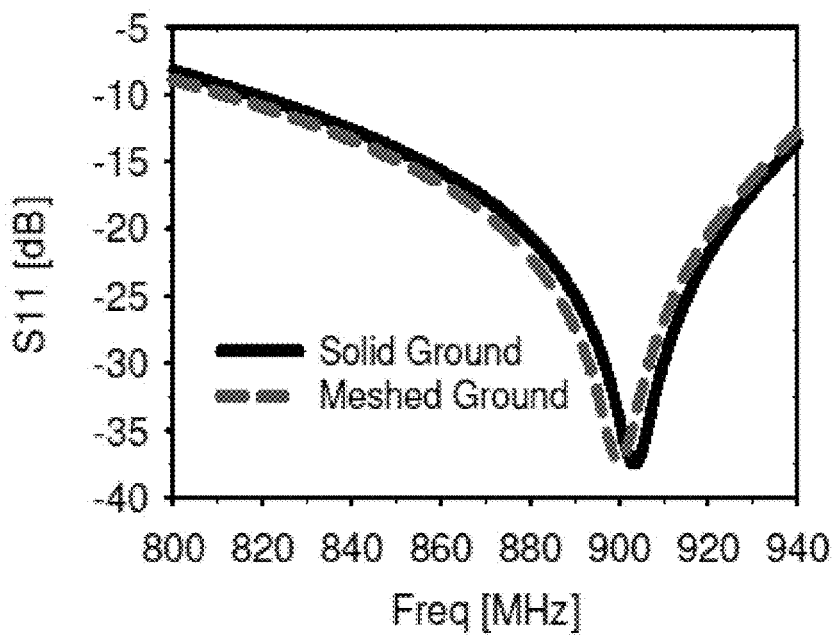
FIG. 6B is a graph that plots simulated reflection coefficient for the tag design of FIG. 6A.

If desired, the amount of conductive paste and the printing time can be reduced when fabricating the RFID tags. FIG. 6A illustrates an example of this. In this embodiment, the paste used to form the ground plane 106' of the RFID tag 100' was reduced by using a meshed configuration instead of a solid one (the ground plane 106' includes a lower portion 108', an end portion 110', and a top portion 112'). The ground density (D) defines the ratio of the conductor used with the meshed ground to the conductor needed for a solid ground. If the mesh dimensions are selected as a=0.45 mm and b=0.45 mm (as illustrated in FIG. 6A) the ground density is 51.5%, which means that approximately half as much ink is needed to fabricate the ground plane. FIG. 6B shows the simulated return loss (referenced to the chip impedance) when using a meshed configuration.

Figure 7A:
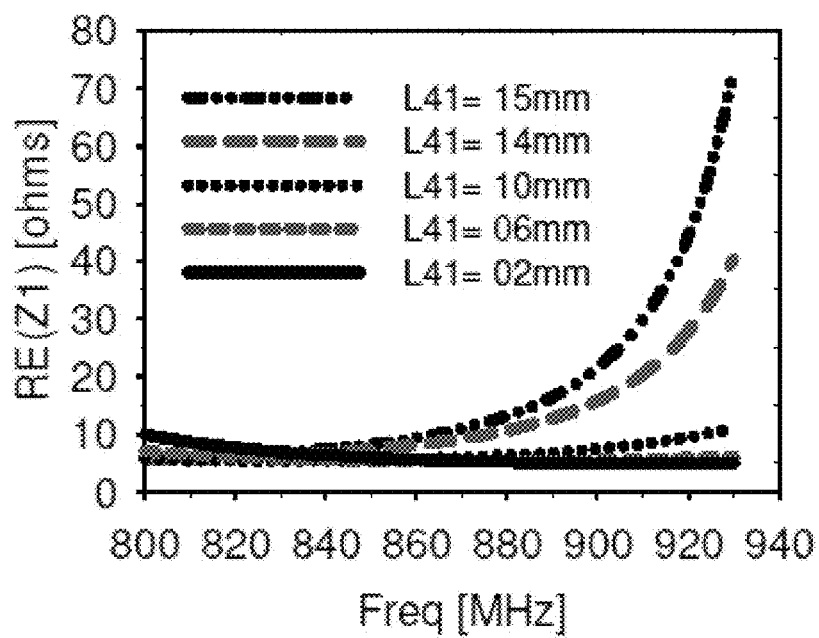
FIGS. 7A and 7B are graphs that show the simulated input impedance for the tag of FIG. 4 including the real part (FIG. 7A) and the imaginary part FIG. 7B).
Figure 7B:
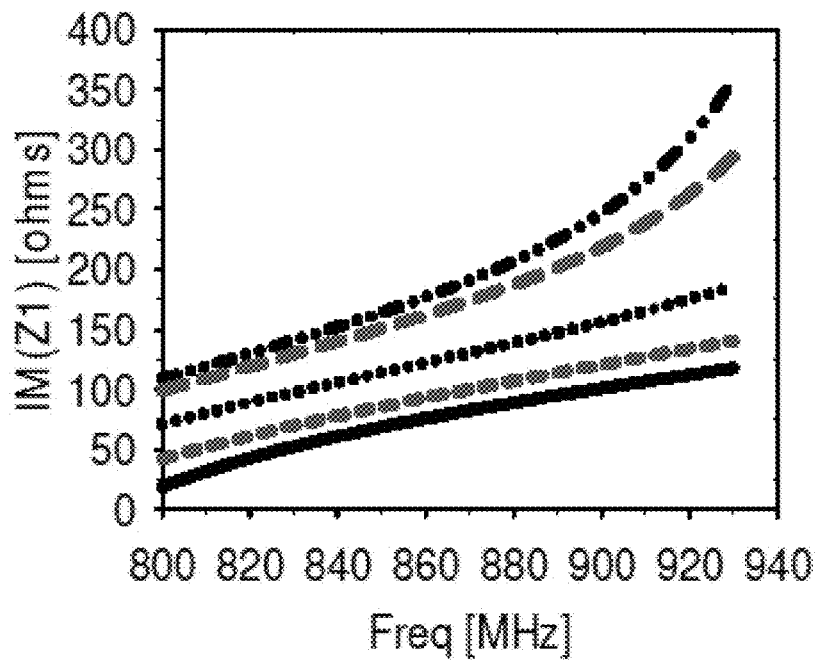

Impedance tuning of the FIG. 4 design to accommodate different ICs or operating frequencies can be accomplished by manipulating the length of the tuning stubs during the initial design stage. In the embodiment of FIG. 4, the tuning stubs are connected to ground and wrapped around the lateral surface before making contact with the radiating arm. The length L41 can be easily adjusted on both stubs to fine tune the antenna's reactance, and consequently the resonant frequency. FIGS. 7A and 7B show the changes in the antenna input impedance for different L41 values.

RFID tags having the above configurations were fabricated and tested, and their performance was evaluated. Radiation pattern measurements were made inside an anechoic chamber. Read range measurements were performed using a movable fixture to manually adjust the distance. A CS101 Handheld RFID reader was used to determine read range for each tag. The distance was measured with a BOSCH GLM15 laser measurement tool. The reader power setting (threshold power) was increased from 10 dBm up to 31 dBm and plotted against maximum read distance. The measured data was fitted with a model consistent with the Friis equation: $\log_{10}(1/d^2)$, where d is the distance between the reader and the tag.

Figure 8A:
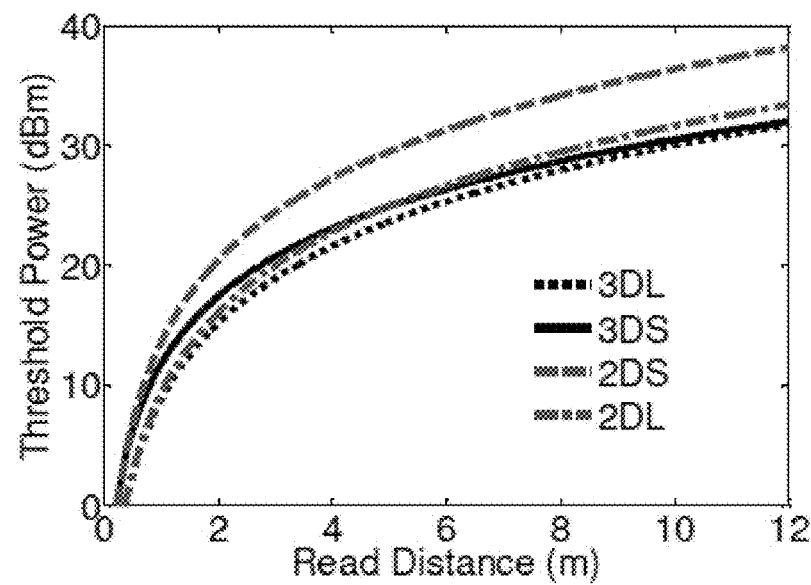
FIG. 8A is a graph that provides an off-metal read distance comparison for the tag designs of FIGS. 1-4.
Figure 8B:
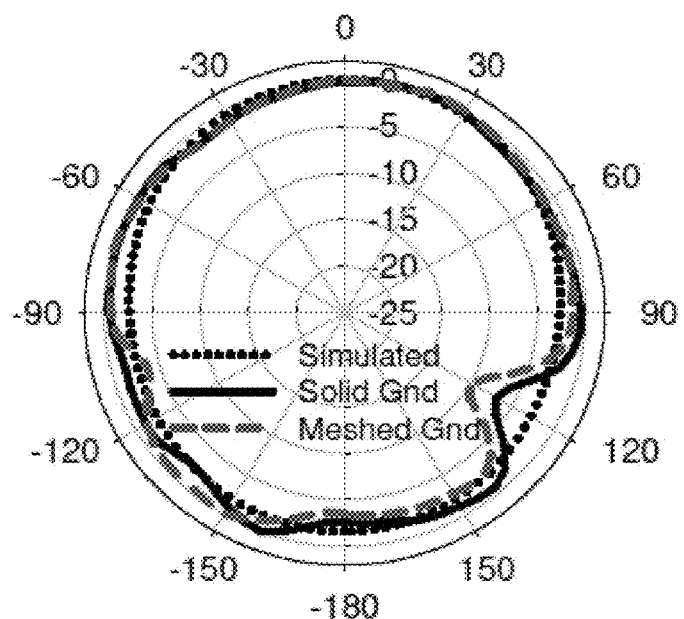
FIGS. 8B and 8C are plots of the off-metal 10 dB normalized radiation patterns in the E-plane (FIG. 8B) and the H-plane (FIG. 8C).
Figure 8C:
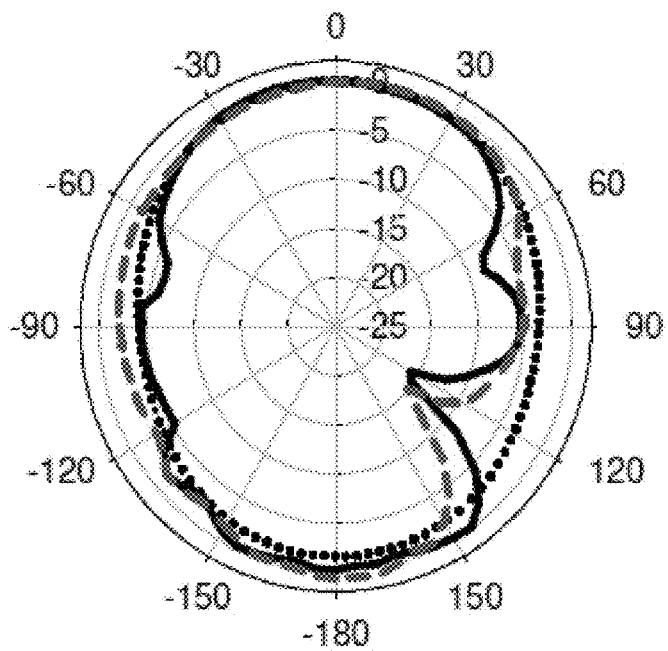

FIG. 8A shows the measured off-metal threshold power against maximum read distance. For 31 dBm threshold power, the FIG. 3 and FIG. 4 designs reached a read distance of approximately 11 m, which is almost 2 meters better than what is obtained with the larger FIG. 1 design. FIGS. 8B and 8C show the simulated and measured E-plane and H-plane normalized gain patterns, respectively.

Figure 9A:
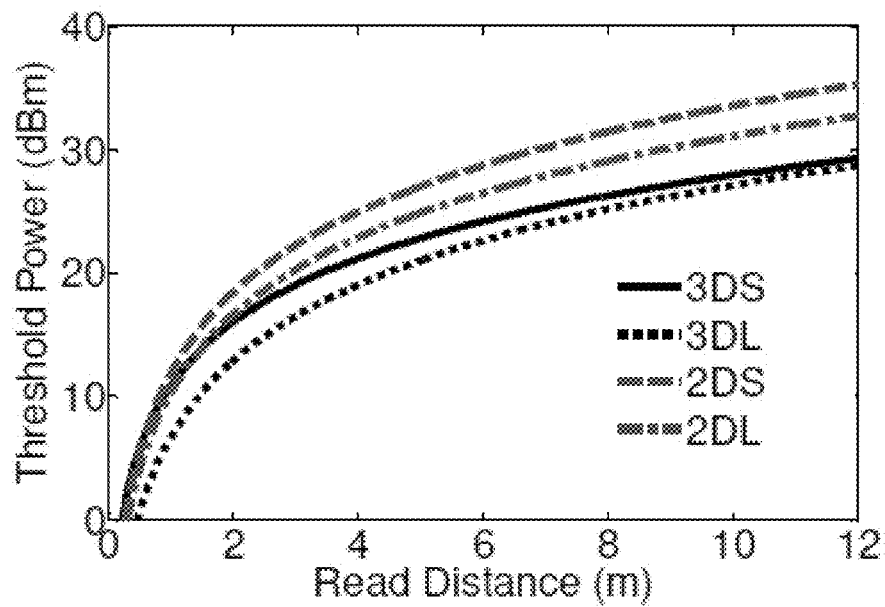
FIG. 9A is a graph that provides an on-metal read distance comparison for the tag designs of FIGS. 1-4.
Figure 9B:
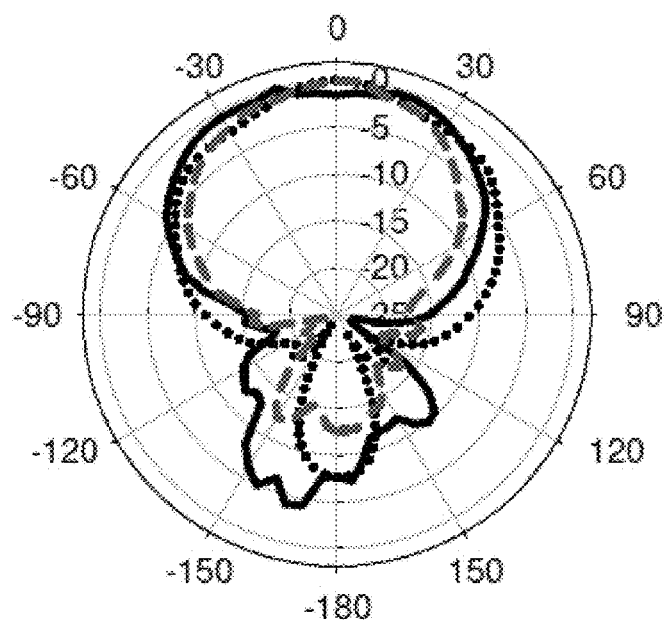
FIGS. 9B and 9C are plots of the on-metal 10 dB normalized radiation patterns in the E-plane (FIG. 9B) and the H-plane (FIG. 9C).
Figure 9C:
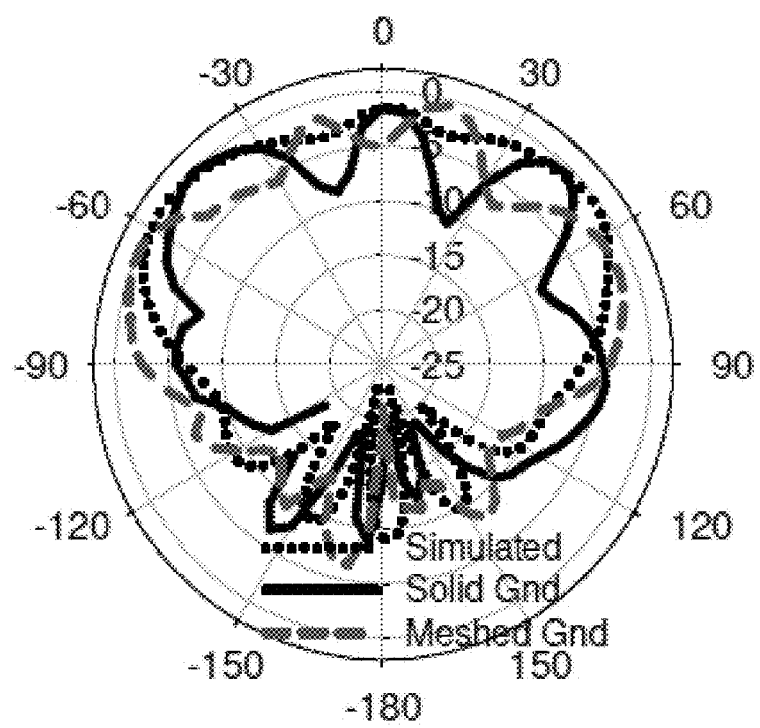

On-metal measurements were performed with the tags placed on a 300×300 mm² copper plane. FIG. 9A shows the measured threshold power against maximum read distance. For 31 dBm threshold power, the FIG. 3 and FIG. 4 designs reached a read distance of approximately 12.5 meters, which is almost 4 meters better than what is obtained with the larger FIG. 1 design. FIGS. 9B and 9C show the simulated and measured E-plane and H-plane normalized gain patterns, respectively, for the on-metal configuration.

Table II provides a comparison of measured read range of the four tag designs and several previously proposed tags.

TABLE II

Measured Read Range Comparison

| Element | Electrical Size (ka) 915 MHz | Measured Off Metal Read Range (m) | Measured On Metal Read Range (m) |
|---|---|---|---|
| 2DL** | 1.093 | 10.0 | 10.2 |
| 2DS** | 0.972 | 6.5 | 7.9 |
| 3DL** | 0.983 | 11.5 | 12.5 |
| 3DS** | 0.588 | 11.3 | 12.1 |
| AMC M [7]* | 1.133 | 10.0 | 8.3 |
| 3-Arm[5]*** | 1.210 | 2.0 | 5.0 |
| Patch[4]* | 1.395 | — | 2.5 |
| Confidex Irons. Micro* | 0.369 | — | 5.0 |

Threshold power = **(1.25 W), *(4 W), ***(2 W)

As described above, multiple RFID tag antenna designs have been disclosed for dual band operation (ISM RFID UHF 864-868 MHz and 902-928 MHz). A baseline tag design (FIG. 1) shows similar on- and off-metal performance. This design was then compressed into 3 different designs having smaller footprints and improved performance. For a threshold power of 31 dBm, the maximum measured on- and off-metal read distance was 12.5 m and 11.5 m, respectively, for the FIG. 3 design, which had dimensions of 97.75×22.5×22 mm. Similar performance was obtained with a more compact design (FIG. 4) with dimensions of 52.75×22.5×22 mm and read range on- and off-metal of 12.1 m and 11.3 m, respectively. Impedance matching and tunability was obtained by using two grounded stubs, enabling functionality with multiple RFID passive ICs.

The invention claimed is:

1. A radio-frequency identification (RFID) tag comprising:
    a substrate having a top surface including first and second ends, a bottom surface, first and second end surfaces, and opposed lateral surfaces;
    a passive RFID integrated circuit (IC) chip mounted to the top surface of the substrate;
    a monopole antenna that includes a planar radiating arm that extends out from the RFID IC chip along the top surface of the substrate and a matching loop having two grounded matching stubs that surround the chip and a portion of the radiating arm, wherein the matching loop extends across the top surface of the substrate and onto the lateral surfaces of the substrate; and
    a ground plane formed on at least the top surface of the substrate, the ground plane being electrically coupled to the matching stubs and the radiating arm.

2. The RFID tag of claim 1, wherein the substrate is made of acrylonitrile butadiene styrene.

3. The RFID tag of claim 1, wherein the substrate is a rectangular cuboid.

4. The RFID tag of claim 1, wherein a thickness of the substrate is approximately one-quarter a length of the substrate.

5. The RFID tag of claim 1, wherein a thickness of the substrate is approximately half a length of the substrate.

6. The RFID tag of claim 1, wherein the radiating arm is linear.

7. The RFID tag of claim 1, wherein the radiating arm is meandered.

8. The RFID tag of claim 1, wherein the ground plane has a meshed configuration.

9. An antenna comprising:
    a substrate having a top surface including first and second ends, a bottom surface, first and second end surfaces, and opposed lateral surfaces;
    a monopole antenna that includes a planar radiating arm that extends along the top surface of the substrate and a matching loop having two grounded matching stubs that surround portion of the radiating arm, wherein the matching loop extends across the top surface of the substrate and onto the lateral surfaces of the substrate; and
    a ground plane formed on at least the top surface of the substrate, the ground plane being electrically coupled to the matching stubs and the radiating arm.

10. The antenna of claim 9, wherein the substrate is made of acrylonitrile butadiene styrene.

11. The antenna of claim 9, wherein the substrate is a rectangular cuboid.

12. The antenna of claim 9, wherein a thickness of the substrate is approximately one-quarter a length of the substrate.

13. The antenna of claim 9, wherein a thickness of the substrate is approximately half a length of the substrate.

14. The antenna of claim 9, wherein the ground plane has a meshed configuration.

15. A method for fabricating a radio-frequency identification (RFID) tag, the method comprising:
    forming a substrate using an additive manufacturing fabrication method, the substrate having a top surface including first and second ends, bottom surface, first and second end surfaces, and opposed lateral surfaces;
    mounting an RFID integrated circuit (IC) chip on the top surface of the substrate;
    printing a monopole antenna on the top surface of the substrate that includes a planar radiating arm that extends from the RFID IC chip and a matching loop having two grounded matching stubs that surround the RFID IC chip and a portion of the radiating arm, wherein the matching loop extends across the top surface of the substrate and onto the lateral surfaces of the substrate; and
    printing a ground plane on at least the top surface of the substrate, the ground plane being electrically coupled to the matching stubs and the radiating arm.

16. The method of claim 15, wherein the planar radiating arm is a meandered planar radiating arm including multiple longitudinal and transverse segments.

* * * * *